(12) United States Patent
Lu et al.

(10) Patent No.: US 10,187,208 B2
(45) Date of Patent: Jan. 22, 2019

(54) RSA ALGORITHM ACCELERATION PROCESSORS, METHODS, SYSTEMS, AND INSTRUCTIONS

(71) Applicant: Intel Corporation, Santa Clara, CA (US)

(72) Inventors: Yang Lu, Shanghai (CN); Xiangzheng Sun, Beijing (CN); Nan Qiao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 15/102,637

(22) PCT Filed: Dec. 28, 2013

(86) PCT No.: PCT/CN2013/090801
§ 371 (c)(1),
(2) Date: Jun. 8, 2016

(87) PCT Pub. No.: WO2015/096167
PCT Pub. Date: Jul. 2, 2015

(65) Prior Publication Data
US 2016/0308676 A1    Oct. 20, 2016

(51) Int. Cl.
*G06F 9/30* (2018.01)
*H04L 9/30* (2006.01)
*G06F 7/72* (2006.01)

(52) U.S. Cl.
CPC .............. *H04L 9/302* (2013.01); *G06F 7/723* (2013.01); *G06F 9/3017* (2013.01)

(58) Field of Classification Search
None
See application file for complete search history.

(56) References Cited

U.S. PATENT DOCUMENTS

| 4,405,829 | A | 9/1983 | Rivest et al. |
| 6,412,063 | B1 * | 6/2002 | Samra ................. G06F 9/30149 712/210 |

(Continued)

FOREIGN PATENT DOCUMENTS

| CN | 1750459 A | 3/2006 |
| CN | 100504758 C | 6/2009 |

(Continued)

OTHER PUBLICATIONS

International Preliminary Report on Patentability and Written Opinion Received for PCT Patent Application No. PCT/CN2013/090801, dated Jul. 7, 2016, 7 pages.

(Continued)

*Primary Examiner* — Eric Coleman
(74) *Attorney, Agent, or Firm* — NDWE, LLP

(57) ABSTRACT

A processor includes a decode unit to decode an instruction. The instruction indicates a first 64-bit source operand having a first 64-bit value, indicates a second 64-bit source operand having a second 64-bit value, indicates a third 64-bit source operand having a third 64-bit value, and indicates a fourth 64-bit source operand having a fourth 64-bit value. An execution unit is coupled with the decode unit. The execution unit is operable, in response to the instruction, to store a result. The result includes the first 64-bit value multiplied by the second 64-bit value added to the third 64-bit value added to the fourth 64-bit value. The execution unit may store a 64-bit least significant half of the result in a first 64-bit destination operand indicated by the instruction, and store a 64-bit most significant half of the result in a second 64-bit destination operand indicated by the instruction.

25 Claims, 14 Drawing Sheets

(56) References Cited

U.S. PATENT DOCUMENTS

| | | | |
|---|---|---|---|
| 6,427,159 | B1 | 7/2002 | Giaume |
| 6,714,197 | B1* | 3/2004 | Thekkath ............... G06F 9/345 345/427 |
| 8,549,264 | B2 | 10/2013 | Gopal et al. |
| 9,804,840 | B2* | 10/2017 | Bradbury ............... G06F 9/3001 |
| 2005/0165876 | A1 | 7/2005 | Mukaida et al. |
| 2007/0061392 | A1* | 3/2007 | Gerwig ................... G06F 7/483 708/523 |
| 2009/0003606 | A1 | 1/2009 | Aciicmez et al. |
| 2010/0183145 | A1 | 6/2010 | Ohyama |
| 2011/0055308 | A1* | 3/2011 | Manton Michael J ...................... G06F 7/5443 708/523 |
| 2011/0153994 | A1* | 6/2011 | Gopal ................. G06F 9/30094 712/221 |
| 2012/0078992 | A1 | 3/2012 | Wiedemeier et al. |

FOREIGN PATENT DOCUMENTS

| | | |
|---|---|---|
| CN | 102662628 A | 9/2012 |
| JP | 2006511833 A | 4/2006 |
| JP | 2010164721 A | 7/2010 |
| JP | 2011134305 A | 7/2011 |
| KR | 20030062422 A | 7/2003 |
| KR | 20050089067 A | 9/2005 |
| WO | 2015/096167 A1 | 2/2015 |

OTHER PUBLICATIONS

International Search Report and Written Opinion received for PCT Patent Application No. PCT/CN2013/090801, dated Sep. 29, 2014, 13 pages.

Decision of Refusal from foreign counterpart Japanese Patent Application No. 2016-529976, dated Jun. 12, 2018, 5 pages.

Extended Eurpoean Search Report for Application No. 13900536.7, dated Jul. 19, 2017, 7 pages.

First Office Action and Search Report from foreign counterpart Chinese Patent Application No. 201380081286.4, dated Mar. 29, 2018, 24 pages.

Grobschadl J., et al., "Architectural Enhancements to Support Digital Signal Processing and Public-Key Cryptography," Proceedings of the 2nd Workshop on Intelligent Solutions in Embedded Systems (WISES 2004), Jan. 2004, pp. 129-143.

Grobschadl J., et al., "Optimized RISC Architecture for Multiple-Precision Modular Arithmetic," Security in Pervasive Computing, Lecture Notes in Computer Science, LNCS, Jan. 27, 2004, pp. 253-270.

Samukawa H., "Floating-point Number representation and Computer Architecture," Information Processing Study Meeting Report of Research, Japan, Information Processing Society of Japan, vol. 92 (46), Jun. 5, 1992, pp. 23-30.

Notice of Rejection from foreign counterpart Japanese Patent Application No. 2016-529976, dated Jun. 29, 2018, 7 pages.

Grant of Patent from foreign counterpart Korean Patent Application No. 10-2016-7014069, dated Sep. 5, 2018, 3 pages.

* cited by examiner

RSAFMAA128 DEST, SRC, [RAX], [RDX]

TEMP1[127:0] ← RAX[63:0] * SRC[63:0]   // SRC HAS "WORD," RAX HAS "IN"

TEMP2[127:0] ← COMBINE (0, RDX[63:0])   // RDX HAS "CARRY"

TEMP2[127:0] ← TEMP2[127:0] + TEMP1[127:0]

TEMP3[127:0] ← COMBINE (0, DEST[63:0])   // DEST HAS "OUT"

TEMP2[127:0] ← TEMP2[127:0] + TEMP3[127:0]

DEST[63:0] ← TEMP2[63:0]   // DEST HAS "OUT*"

RDX[63:0] ← TEMP2[127:64]   // RDX HAS "CARRY*"

RSA
ACCELERATION
INSTRUCTION
FORMAT
550

| OPCODE 552 | SOURCE / DEST SPECIFIER 554 | SOURCE SPECIFIER 556 | IMPLICIT RAX SOURCE 558 | IMPLICIT RDX SOURCE / DEST 560 |

| 63 | 31 | 0 | |
|---|---|---|---|
| | | EAX | RAX |
| | | EBX | RBX |
| | | ECX | RCX |
| | | EDX | RDX |
| | | ESI | RSI |
| | | EDI | RDI |
| | | EBP | RBP |
| | | ESP | RSP |
| | | | R8 |
| | | | R9 |
| | | | R10 |
| | | | R11 |
| | | | R12 |
| | | | R13 |
| | | | R14 |
| | | | R15 |

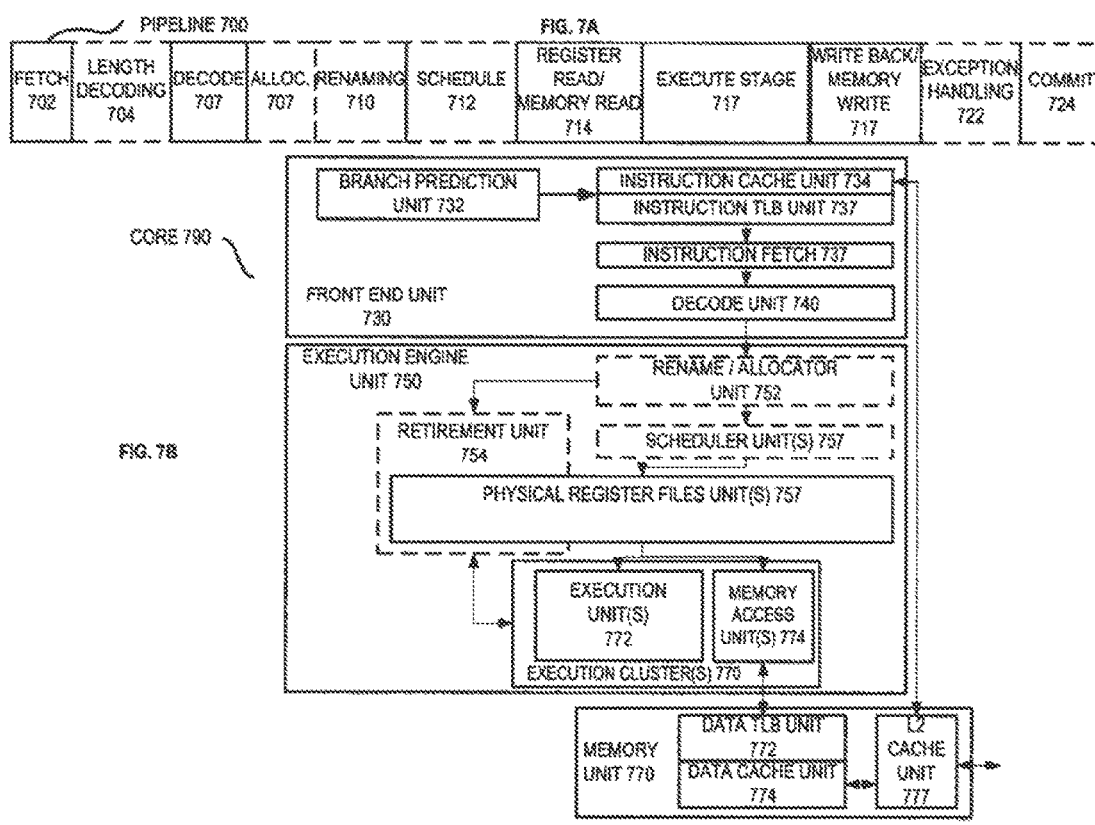

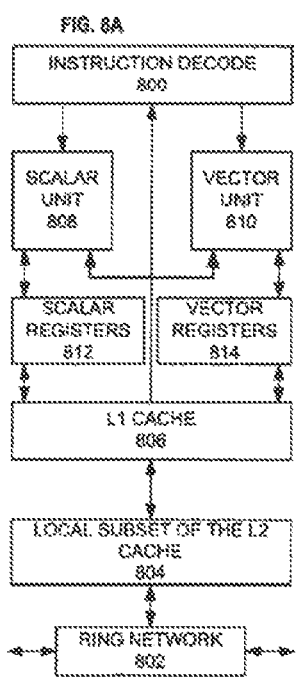
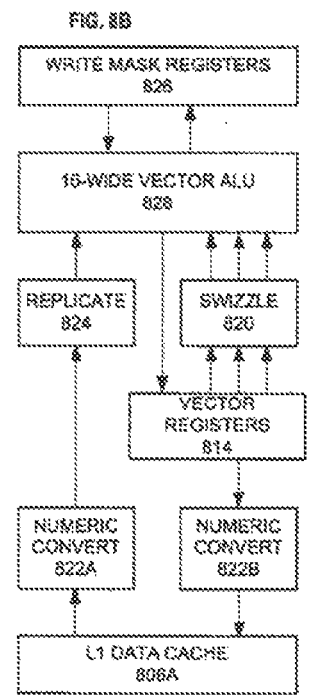

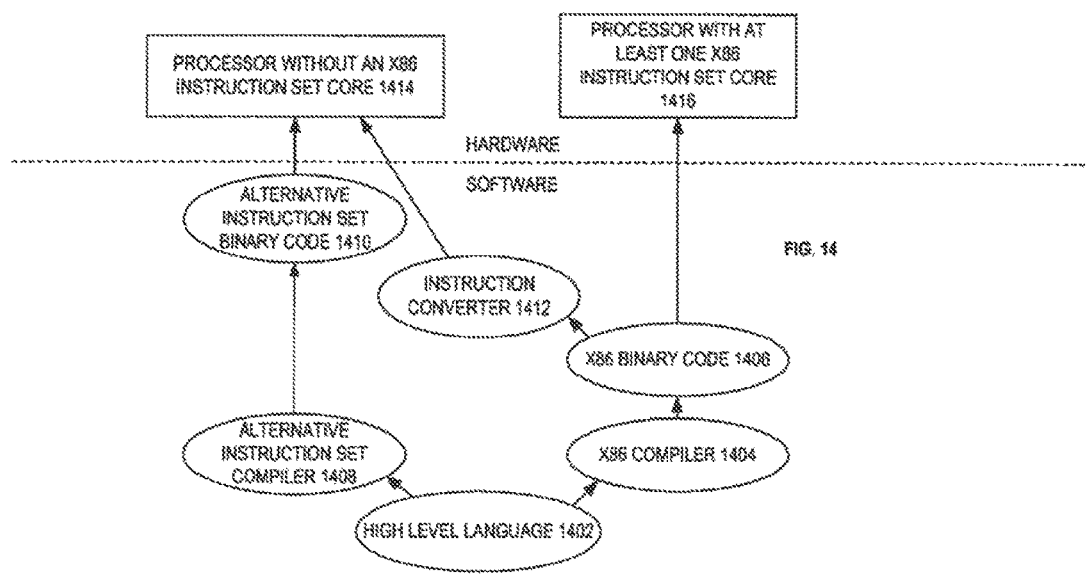

RSA ALGORITHM ACCELERATION PROCESSORS, METHODS, SYSTEMS, AND INSTRUCTIONS

CROSS-REFERENCE TO RELATED APPLICATION

This patent application is a U.S. National Phase Application under 35 U.S.C. Section 317 of International Application No. PCT/CN2013/090802, filed on Dec. 28, 2013, titled "RSA ALGORITHM ACCELERATION PROCESSORS, METHODS, SYSTEM, AND INSTRUCTIONS".

BACKGROUND

Technical Field

Embodiments described herein generally relate to processors. In particular, embodiments described herein generally relate to processors to execute instructions to accelerate cryptographic algorithms.

Background Information

RSA (Ron Rivest, Adi Shamir, and Leonard Adleman) is a well-known and widely used public-key cryptography algorithm. The RSA algorithm is composed of key generation, encryption, and decryption. RSA is based on an RSA key pair that includes an RSA public key and an RSA private key. The RSA public key may be known publically (e.g., by anyone) and may be used to encrypt messages. The RSA private key is used to decrypt the messages. The RSA private key should not be publically known, but rather kept secret or reserved only for those who are intended to decrypt the encrypted messages. At a high level, the RSA algorithm is based on the presumed difficulty of factoring large integers. The RSA public key generally includes the product of two large prime numbers and an auxiliary value. The prime factors are kept secret and used to decrypt encrypted messages. The security provided by the RSA algorithm is based on the presumption that messages encrypted with the public key can only be decrypted feasibly and/or in a reasonable amount of time by using the private key. Further details on the RSA algorithm, if desired, are available in Request for Comments 3447, Public-Key Cryptography Standards (PKCS) #1: RSA Cryptography Specifications Version 2.1, by J. Jonsson and B. Kalinski of RSA Laboratories, February 2003. Further details on the RSA algorithm, if desired, are also available in U.S. Pat. No. 4,405,829. However, a detailed understanding of the RSA algorithm is not required to understand the embodiments of the invention disclosed herein.

As mentioned above, the RSA algorithm is a widely used public-key cryptography algorithm. As a result, significant effort has been expended over the years to increase the speed and efficiency of implementing the RSA algorithm. This has been done through both a hardware and software perspective. One of the more common ways of implementing the RSA algorithm is with the OpenSSL library. The OpenSSL library is an open source software library that supports various cryptographic algorithms including the RSA algorithm. However, even with the efforts to improve the speed and efficiency of implementing the RSA algorithm, its implementation often still tends to be relatively computationally intensive. Accordingly, further ways of improving the speed and/or efficiency of implementing the RSA algorithm would be advantageous.

BRIEF DESCRIPTION OF THE DRAWINGS

The invention may best be understood by referring to the following description and accompanying drawings that are used to illustrate embodiments. In the drawings:

FIG. 4 shows pseudocode represents an operation of an example embodiment of an RSA acceleration instruction.

FIG. 5 is a block diagram of an example embodiment of a suitable instruction format.

FIG. 6 illustrates an example embodiment of a suitable 64-bit general-purpose register set.

FIG. 7A is a block diagram illustrating both an exemplary in-order pipeline and an exemplary register renaming, out-of-order issue/execution pipeline according to embodiments of the invention.

FIG. 7B is a block diagram illustrating both an exemplary embodiment of an in-order architecture core and an exemplary register renaming, out-of-order issue/execution architecture core to be included in a processor according to embodiments of the invention.

FIG. 8A is a block diagram of a single processor core, along with its connection to the on-die interconnect network and with its local subset of the Level 2 (L2) cache 804, according to embodiments of the invention.

FIG. 8B is an expanded view of part of the processor core in FIG. 8A according to embodiments of the invention.

FIG. 14 is a block diagram contrasting the use of a software instruction converter to convert binary instructions in a source instruction set to binary instructions in a target instruction set according to embodiments of the invention.

DETAILED DESCRIPTION OF EMBODIMENTS

Figure 1:
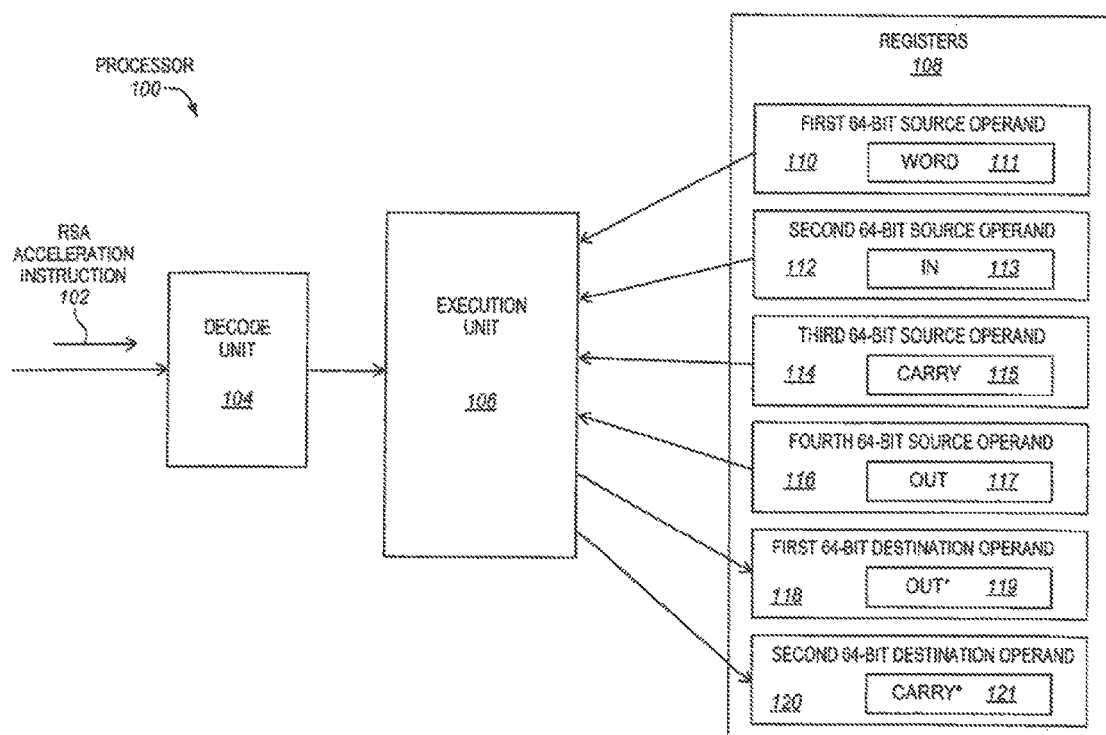
FIG. 1 is a block diagram of an embodiment of a processor that is operable to perform an embodiment of an RSA acceleration instruction.

Disclosed herein are RSA acceleration instructions, processors to execute the RSA acceleration instructions, methods performed by the processors when processing or executing the RSA acceleration instructions, and systems incorporating one or more processors to process or execute the RSA acceleration instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

The implementation of the RSA algorithm using the OpenSSL library has been analyzed. During this analysis, the Intel® VTune™ analyzer has been used to perform application profiling type of analysis using a benchmark workload. The analysis included identifying particular functions or portions of the OpenSSL library implementation of the RSA algorithm that consumed the greatest relative proportions of overall execution time. These functions are often referred to as "hot functions." One particular "hot function" in the OpenSSL implementation of the RSA algorithm, which is named bn_mul_mont, was found to be the most time consuming function. In addition, the instructions that make up the hot function bn_mul_mont were also analyzed. It was found that a subset of these instructions alone were responsible for a relatively large proportion of the overall execution time. In other words, a particular subset of code within the hot function bn_mul_mont represents relatively "hot code," which consumes a relative large proportion of overall execution time.

Table 1 is a table listing a set of instructions from the function bn_mul_mont of the OpenSSL implementation of the RSA algorithm that have been observed to consume a relative large proportion of the overall execution time for implementing the RSA algorithm. Without limitation, it is believed that execution of this set of instructions consumes on the order of about half of the overall execution time for implementing the RSA algorithm for the particular workload and analysis performed.

the previous iteration. The overall operation of these seven instructions is to generate a result that is equal to WORD*IN+CARRY+OUT. The multiplication of the parameters WORD*IN may produce a product of up to 128-bits (twice the size of the 64-bit parameters). The product is stored in a 128-bit storage represented by RDX:RAX. As a result, the two subsequent add instructions involving RAX need to be performed as 128-bit additions, since a carry or overflow is possible out of the 64-bit registers into the register RDX used to store bits [128:64] of the value. Accordingly, the ADD and ADC instructions are used together to implement the 128-bit addition. The state of the carry flag (CF) used by the ADC instruction represents a carry out of the previous addition performed by the preceding ADD instruction. That is, due to the implementation via a 64-bit architecture having only 64-bit but not 128-bit registers, the 128-bit additions are implemented through the ADD and ADC instruction pairs. The result generated by these seven instructions is output as two output parameters OUT* and CARRY*.

In some embodiments, several, at least five, at least six, or all seven of the instructions of Table 1 may be implemented by a single new RSA acceleration instruction. In some embodiments, at least the instructions represented by lines 2-6 may be implemented in this single new instruction. In

TABLE 1

Hot Code from OpenSSL function bn_mul_mont

| Line | Instruction | Operation |
|---|---|---|
| 1 | MOV RAX, IN | The MOV (move) instruction copies source operand (having IN) to destination operand (specified register RAX). Operation is: DEST←SRC. Source operand is 64-bits, and may be general-purpose register or memory location. |
| 2 | MUL WORD | The MUL (multiply) instruction multiplies source/destination operand (implicit register RAX) and source operand (having WORD) and stores product in destination (implicit registers RDX:RAX). Operation is: RDX:RAX←RAX*SRC. Source operand is 64-bits, and may be general-purpose register or memory location. |
| 3 | ADD RAX, CARRY | The ADD (add) instruction adds source/destination operand (specified register RAX) and source operand (having CARRY) and stores sum in destination (specified register RAX). Operation is: DEST←DEST + SRC. Source operand is 64-bits, and may be general-purpose register or memory location. ADD instruction also sets carry flag (CF) to indicate a carry (overflow) in sum. |
| 4 | ADC RDX, 0 | The ADC (add with carry) instruction adds source/destination operand (specified register RDX), source operand (having 0), and carry flag (CF), and stores sum in destination (specified register RDX). Operation is: DEST←DEST + SRC + CF. |
| 5 | ADD OUT, RAX | Adds source/destination operand (OUT) and source operand (specified register RAX) and stores sum in destination (as OUT*). Operation is: DEST←DEST + SRC. Also sets carry flag (CF) to indicate a carry (overflow) in sum. The destination is 64-bits, and may be general-purpose register or memory location. |
| 6 | ADC RDX, 0 | Adds source/destination operand (specified register RDX), source operand (having 0), and carry flag (CF), and stores sum in destination (specified register RDX). Operation is: DEST←DEST + SRC + CF. |
| 7 | MOV CARRY, RDX | Copies source operand (specified register RDX) to destination operand (as CARRY*). Operation is: DEST←SRC. Destination is 64-bits, and may be general-purpose register or memory location. |

The operations of Table 1 are the core part of loops of the RSA algorithm. The input parameters to the above code are the four parameters WORD, IN, OUT, and CARRY, which are all 64-bit parameters. The parameters IN and OUT are one element of arrays and updated using the following contiguous value in the next iteration. The parameter WORD is unchanged during the iterations. The parameter CARRY is inherited from the previous iteration. By inherited it is meant that the output of previous cycle is the input of the next. The parameter OUT is sometimes inherited from other embodiments, the instructions represented by line 1 and/or line 7 may also optionally be implemented in this single new instruction. Advantageously, the RSA acceleration instruction may help to increase the speed and/or efficiency of implementing the RSA algorithm especially when implemented using the OpenSSL library, and especially when implemented using the function bn_mul_mont.

FIG. 1 is a block diagram of an embodiment of a processor 100 that is operable to perform an embodiment of an RSA acceleration instruction 102. In some embodiments, the processor may be a general-purpose processor (e.g., of the type commonly used in desktop, laptop, or other computers). Alternatively, the processor may be a special-purpose processor. Examples of suitable special-purpose processors include, but are not limited to, cryptographic processors, network processors, communications processors, co-processors, graphics processors, embedded processors, digital signal processors (DSPs), and controllers (e.g., microcontrollers), to name just a few examples. The processor may be any of various complex instruction set computing (CISC) processors, various reduced instruction set computing (RISC) processors, various very long instruction word (VLIW) processors, various hybrids thereof, or other types of processors.

During operation, the processor 100 may receive the embodiment of the RSA acceleration instruction 102. For example, the RSA acceleration instruction may be received from an instruction fetch unit, an instruction queue, or the like. The RSA acceleration instruction may represent a macroinstruction, assembly language instruction, machine code instruction, or other instruction or control signal of an instruction set of the processor. In some embodiments, the RSA acceleration instruction may explicitly specify (e.g., through one or more fields or a set of bits), or otherwise indicate (e.g., implicitly indicate), a first 64-bit source operand 110 that is to have a first 64-bit value 111 (in the illustration labeled "WORD"), and may explicitly specify or otherwise indicate a second 64-bit source operand 112 that is to have a second 64-bit value 113 (in the illustration labeled "IN"). The RSA acceleration instruction may also explicitly specify or otherwise indicate a third 64-bit source operand 114 that is to have a third 64-bit value 115 (in the illustration labeled "CARRY"), and may explicitly specify or otherwise indicate a fourth 64-bit source operand 116 that is to have a fourth 64-bit value 117 (in the illustration labeled "OUT").

Referring again to FIG. 1, the processor includes a decode unit or decoder 104. The decode unit may receive and decode instructions, including the RSA acceleration instruction 102. The decode unit may output one or more microinstructions, micro-operations, micro-code entry points, decoded instructions or control signals, or other relatively lower-level instructions or control signals that reflect, represent, and/or are derived from the RSA acceleration instruction. The one or more relatively lower-level instructions or control signals may implement the relatively higher-level RSA acceleration instruction through one or more relatively lower-level (e.g., circuit-level or hardware-level) operations. In some embodiments, the decode unit may include one or more input structures (e.g., input port(s), input interconnect(s), an input interface, etc.) to receive the instruction, an instruction recognition logic coupled with the input structures to receive and recognize the RSA acceleration instruction, a decode logic coupled with the recognition logic to receive and decode the RSA acceleration instruction, and one or more output structures (e.g., output port(s), output interconnect(s), an output interface, etc.) coupled with the decode logic to output one or more corresponding lower level instructions or control signals. The recognition logic and the decode logic may be implemented using various different mechanisms including, but not limited to, microcode read only memories (ROMs), look-up tables, hardware implementations, programmable logic arrays (PLAs), and other mechanisms used to implement decode units known in the art.

The processor 100 also includes a set of registers 108. In some embodiments, the registers may include general-purpose registers operable to hold 64-bit data. The term general-purpose is often used to refer to an ability to store data or addresses in the registers, although this is not required. Each of the general-purpose registers may represent an on-die storage location that is operable to store data. The general-purpose registers may represent architecturally-visible registers (e.g., an architectural register file). The architecturally-visible or architectural registers are visible to software and/or a programmer and/or are the registers indicated by instructions to identify operands. These architectural registers are contrasted to other non-architectural or non-architecturally visible registers in a given microarchitecture (e.g., temporary registers, reorder buffers, retirement registers, etc.). The registers may be implemented in different ways in different microarchitectures using well-known techniques and are not limited to any particular type of circuit. Various different types of registers are suitable. Examples of suitable types of registers include, but are not limited to, dedicated physical registers, dynamically allocated physical registers using register renaming, and combinations thereof. In some embodiments the register may be those of FIG. 5, although the scope of the invention is not so limited.

As shown, in some embodiments, the first 64-bit source operand 110 may be stored in a first general-purpose register, the second 64-bit source operand 112 may be stored in a second general-purpose register, the third 64-bit source operand 114 may be stored in a third general-purpose register, and the fourth 64-bit source operand 116 may be stored in a fourth general-purpose register. In some embodiments, the general-purpose register RAX may optionally be used to store the second 64-bit source operand that is to have the parameter IN. In some embodiments, the RAX register may be implicitly indicated or implicit to the instruction. Advantageously, the use of the register RAX may provide increased conformance to the particular registers used in the MOV and MUL instruction from Table 1. Alternatively, other registers may be used, or an additional MOV instruction similar to the first MOV instruction in line 1 of Table 1 may optionally be used. Alternatively, memory locations, or other storage locations, may be used for one or more of the four source operands. For example, in some embodiments, memory operations may potentially be used for one or more of the first and fourth source operands, although this is not required.

Referring again to FIG. 1, the execution unit 106 is coupled with the decode unit 104 and the registers 108. By way of example, the execution unit may include an arithmetic unit, an arithmetic logic unit, a digital circuit to perform arithmetic and logical operations, a digital circuit including a multiplier and adders, or the like. The execution unit may receive the one or more decoded or otherwise converted instructions or control signals that represent and/or are derived from the RSA acceleration instruction 102. The execution unit may also receive the first 64-bit source operand 110 that is to have the first 64-bit value 111 (in the illustration labeled "WORD"), the second 64-bit source operand 112 that is to have the second 64-bit value 113 (in the illustration labeled "IN"), the third 64-bit source operand 114 that is to have the third 64-bit value 115 (in the illustration labeled "CARRY"), and the fourth 64-bit source operand 116 that is to have the fourth 64-bit value 117 (in the illustration labeled "OUT"). The execution unit is operable in response to and/or as a result of the RSA acceleration instruction (e.g., in response to one or more instructions or control signals decoded directly or indirectly (e.g., through emulation) from the instruction) to store a result.

In some embodiments, the result may include a value that is equal to and/or represents the first 64-bit value (WORD) multiplied by the second 64-bit value (IN) added to the third 64-bit value (CARRY) added to the fourth 64-bit value (OUT). In some embodiments, the result may be stored in a first 64-bit destination operand 118 specified or otherwise indicated by the instruction and a second 64-bit destination operand 120 specified or otherwise indicated by the instruction. In some embodiments, a 64-bit least significant (e.g., lowest order) half of the result 119 (labeled in the illustration "OUT*") may be stored in the first 64-bit destination operand 118 indicated by the instruction. That is, the first 64-bit destination operand 118 may store bits [63:0] of the result WORD*IN+CARRY+OUT. In some embodiments, a 64-bit most significant (e.g., highest order) half of the result 121 (labeled in the illustration "CARRY*") may be stored in a second 64-bit destination operand 120 indicated by the instruction. That is, the second 64-bit destination operand 120 may store bits [127:64] of the result WORD*IN+CARRY+OUT.

As shown, in some embodiments, the first and second destination operands 118, 120 may optionally be registers (e.g., general-purpose registers). In some embodiments, the general-purpose register RDX may optionally be used to store the second 64-bit destination operand that is to have the parameter CARRY*. In some embodiments, the RDX register may be implicitly indicated or implicit to the instruction. Advantageously, the use of the register RDX may provide increased conformance to the particular register used by the ADC instructions from line 6 of Table 1 and may help to eliminate the MOV instruction in line 7. Alternatively, other registers may be used and/or an additional MOV instruction similar to the second MOV instruction in line 7 of Table 1 may optionally be used. Alternatively, instead of using registers, memory locations, or other storage locations, may be used for one or more of the destination operands. For example, in some embodiments, a memory operation may optionally be used for the first destination operand, although this is not required.

The execution unit and/or the processor may include specific or particular logic (e.g., transistors, integrated circuitry, or other hardware potentially combined with firmware (e.g., instructions stored in non-volatile memory) and/or software) that is operable to perform the RSA acceleration instruction and/or store the result in response to and/or as a result of the RSA acceleration instruction (e.g., in response to one or more instructions or control signals decoded or otherwise derived from the RSA acceleration instruction). In some embodiments, the execution unit may include one or more input structures (e.g., input port(s), input interconnect(s), an input interface, etc.) to receive source operands, circuitry or logic (e.g., a multiplier and at least one adder) coupled with the input structure(s) to receive and process the source operands and generate the result operand, and one or more output structures (e.g., output port(s), output interconnect(s), an output interface, etc.) coupled with the circuitry or logic to output the result operand. In some embodiments, the execution unit may include the circuitry or logic of FIG. 3.

To avoid obscuring the description, a relatively simple processor 100 has been shown and described. In other embodiments, the processor may optionally include other well-known processor components. Possible examples of such components include, but are not limited to, an instruction fetch unit, instruction and data caches, second or higher level caches, out-of-order execution logic, an instruction scheduling unit, a register renaming unit, a retirement unit, a bus interface unit, instruction and data translation lookaside buffers, prefetch buffers, microinstruction queues, microinstruction sequencers, other components included in processors, and various combinations thereof. Numerous different combinations and configurations of such components are suitable. Embodiments are not limited to any known combination or configuration. Moreover, embodiments may be included in processors have multiple cores, logical processors, or execution engines at least one of which has a decode unit and an execution unit to perform an embodiment of a RSA acceleration instruction.

Figure 2:
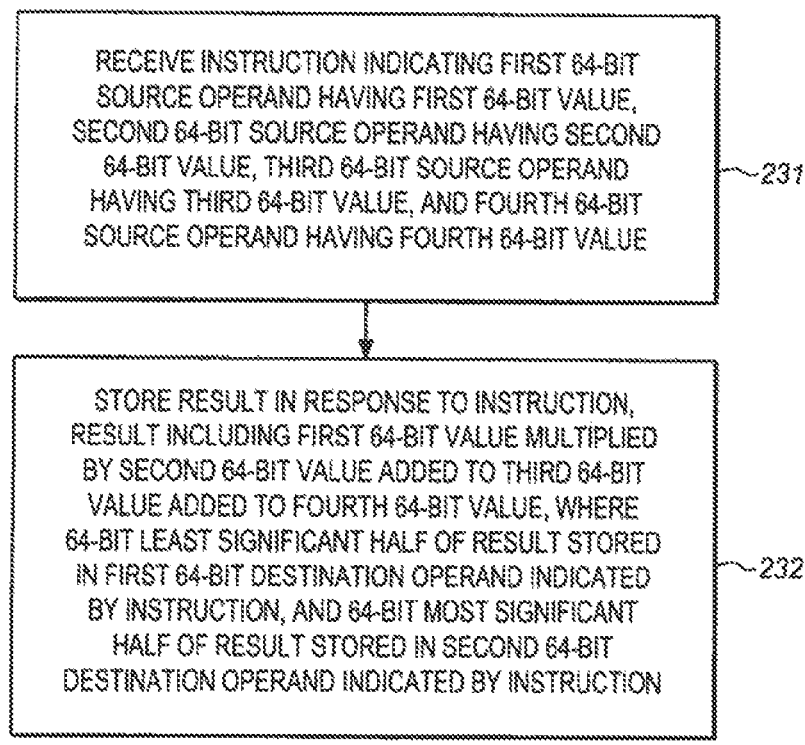
FIG. 2 is a block flow diagram of an embodiment of a method of processing an embodiment of an RSA acceleration instruction.

FIG. 2 is a block flow diagram of an embodiment of a method 230 of processing an embodiment of an RSA acceleration instruction. In various embodiments, the method may be performed by a processor, instruction processing apparatus, or other digital logic device. In some embodiments, the operations and/or method of FIG. 2 may be performed by and/or within the processor of FIG. 1. The components, features, and specific optional details described herein for the processor of FIG. 1 also optionally apply to the operations and/or method of FIG. 2. Alternatively, the operations and/or method of FIG. 2 may be performed by and/or within a similar or different processor or apparatus. Moreover, the processor and/or apparatus of FIG. 1 may perform operations and/or methods the same as, similar to, or different than those of FIG. 2.

The method includes receiving the RSA acceleration instruction, at block 231. In various aspects, the instruction may be received at a processor, an instruction processing apparatus, or a portion thereof (e.g., an instruction fetch unit, a decode unit, a bus interface unit, etc.). In various aspects, the instruction may be received from an off-die source (e.g., from memory, interconnect, etc.), or from an on-die source (e.g., from an instruction cache, instruction queue, etc.). The RSA acceleration instruction may specify or otherwise indicate a first 64-bit source operand having a first 64-bit value (e.g., WORD), may specify or otherwise indicate a second 64-bit source operand having a second 64-bit value (e.g., IN), may specify or otherwise indicate a third 64-bit source operand having a third 64-bit value (e.g., CARRY), and may specify or otherwise indicate a fourth 64-bit source operand having a fourth 64-bit value (e.g., OUT).

A result is stored in response to and/or as a result of the RSA acceleration instruction, at block 232. Representatively, an execution unit, instruction processing apparatus, or processor may perform the instruction and store the result. In some embodiments, the result may include the first 64-bit value (e.g., WORD) multiplied by the second 64-bit value (e.g., IN) added to the third 64-bit value (e.g., CARRY) added to the fourth 64-bit value (e.g., OUT). In some embodiments, a 64-bit least significant (e.g., lowest order) half of the result (e.g., OUT*) may be stored in a first 64-bit destination operand indicated by the instruction. In some embodiments, a 64-bit most significant (e.g., highest order) half of the result (e.g., CARRY*) may be stored in a second 64-bit destination operand indicated by the instruction. As shown, in some embodiments, the destination operands may be general-purpose registers. Alternatively, memory locations or other storage locations may optionally be used for one or more of these operands.

In some embodiments, the method 230 may be performed while implementing an RSA algorithm. In some embodiments, the method may be performed during an OpenSSL library implementation of an RSA algorithm. In some embodiments, the method may be performed during a function bn_mul_mont of the OpenSSL library implementation of the RSA algorithm.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction, etc. In some embodiments, the microarchitectural operations to implement the instruction may optionally include a multiplication operation and two addition operations.

Figure 3:
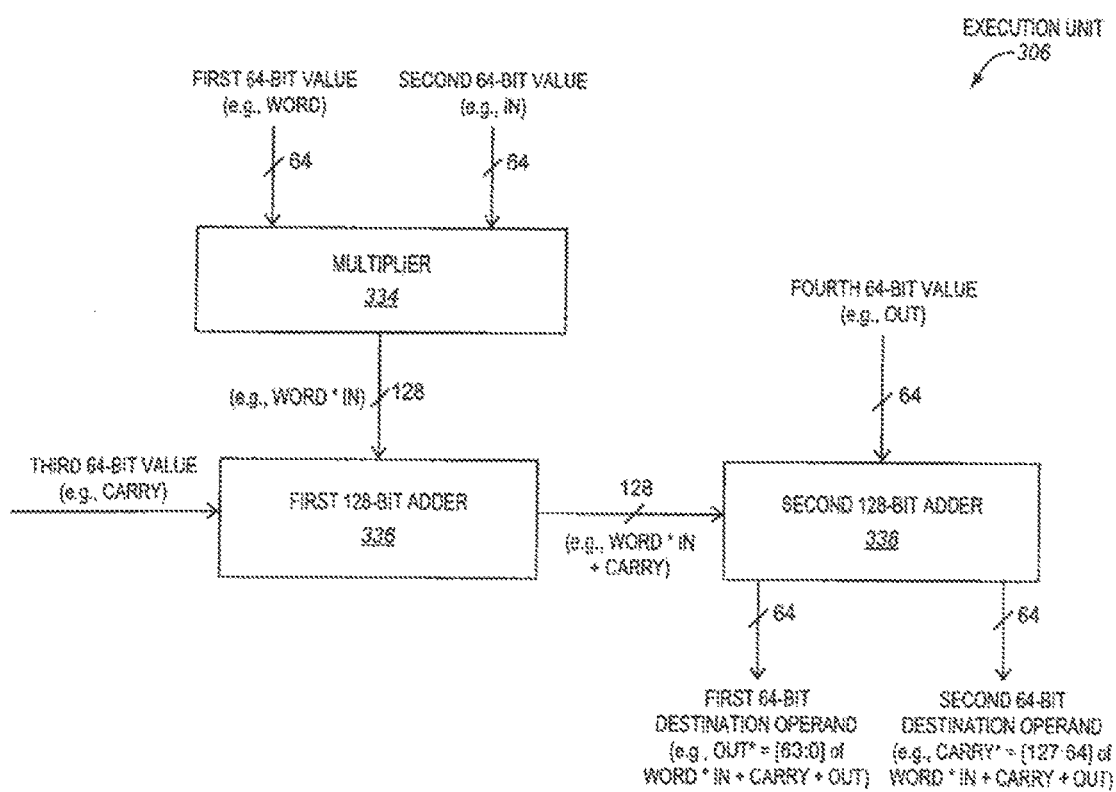
FIG. 3 is a block diagram of an example embodiment of a micro-architecture for an embodiment of an execution unit.

FIG. 3 is a block diagram of an example embodiment of a micro-architecture for an embodiment of an execution unit 306. The execution unit includes a multiplier 334. The multiplier may have a first 64-bit input coupled to receive a first 64-bit value (e.g., WORD) from a first 64-bit source operand, and a second 64-bit input coupled to receive a second 64-bit value (e.g., IN) from a second 64-bit source operand. The multiplier may be operable to multiply the first and second 64-bit values to form a 128-bit product (e.g., WORD*IN). The multiplier may have a 128-bit output to output the product.

The execution unit also includes a first 128-bit adder 336. The first 128-bit adder has a 128-bit input coupled with the 128-bit output of the multiplier to receive the 128-bit product (e.g., WORD*IN). The first 128-bit adder also has a 64-bit input coupled to receive a third 64-bit value (e.g., CARRY). The first 128-bit adder may add the third 64-bit value to the 128-bit product to produce a first 128-bit sum (e.g., WORD*IN+CARRY). The first 128-bit adder may have a 128-bit output to output the first 128-bit sum.

The execution unit also includes a second 128-bit adder 338. The second 128-bit adder has a 128-bit input coupled with the 128-bit output of the first adder to receive the first 128-bit sum (e.g., WORD*IN+CARRY). The second 128-bit adder also has a 64-bit input coupled to receive a fourth 64-bit value (e.g., OUT). The second 128-bit adder may add the fourth 64-bit value to the first 128-bit sum to produce a second 128-bit sum (e.g., WORD*IN+CARRY+OUT). In some embodiments, the second 128-bit adder may have a first 64-bit output to output a first lower order 64-bit half of the second 128-bit sum (e.g., bits [63:0] of the value WORD*IN+CARRY+OUT) to a first 64-bit destination operand. The second 128-bit adder may also have a second 64-bit output to output a second higher order 64-bit half of the second 128-bit sum (e.g., bits [127:64] of the value WORD*IN+CARRY+OUT) to a second 64-bit destination operand.

FIG. 4 shows pseudocode represents an operation of an example embodiment of an RSA acceleration instruction 402. The RSA acceleration instruction has the pneumonic RSAFMAA128. The instruction RSAFMAA128 has a format in which a 64-bit source/destination operand (DEST) is explicitly specified, a 64-bit source operand (SRC) is explicitly specified, a 64-bit source general-purpose register RAX is implicit, and a 64-bit source/destination general-purpose register RDX is implicit. The registers RAX and RDX are shown in brackets in the instruction encoding to indicate that they are implicit. In other embodiments, fewer or more operands may be explicitly specified and/or fewer or more operations may be implicit.

In the pseudocode, TEMP1, TEMP2, and TEMP3 represent temporary registers (e.g., micro-architectural registers). The symbol ← represents storing. In other embodiments, fewer or more temporary registers may optionally be used. The COMBINE operation is used to combine two 64-bit operands into a 128-bit operand. For example, COMBINE (0x1, 0x2) is 0x10000000000000002. Notice that the additions are performed on 128-bit operands, which provides increased efficiency and/or speed over needing to perform two separate pairs of ADD and ADC instructions.

DEST is used initially as a source operand and then subsequently as a destination operand. DEST may be a 64-bit general-purpose register or a 64-bit memory location and has read and write capability. In cases where the value of OUT is inherited, a register may offer certain advantages, whereas in cases where OUT is not inherited there may be advantages to using a memory location. In some embodiments, SRC may be a 64-bit general-purpose register or a 64-bit memory location and has read capability but not necessarily write capability.

Advantageously, in some embodiments, RAX may be used to provide the parameter IN. This may provide increased conformity with the first MOV instruction in line 1 of Table 1. Alternatively, another register may be used and/or an additional MOV instruction may be included outside of the RSAFMAA128 instruction.

Advantageously, in some embodiments, RDX may be used as a destination operand to provide the parameter CARRY*. This may provide increased conformity with the last MOV instruction in line 7 of Table 1. Alternatively, another register may be used and/or an additional MOV instruction may be included outside of the RSAFMAA128 instruction. Notice also that, in some embodiments, RDX may be used both initially as a source operand to provide a parameter (e.g., CARRY) and subsequently as a destination operand. Such reuse may help to avoid needing another register. Alternatively, a different register may optionally be used as a source operand to provide the parameter (e.g., CARRY). The value of RDX may be inherited during iterations.

FIG. 5 is a block diagram of an example embodiment of a suitable instruction format 550. The instruction format includes an operation code or opcode 552. The opcode may represent a plurality of bits or one or more fields that are operable to identify the instruction and/or the operation to be performed. In some embodiments, the opcode may represent or be associated with an RSA acceleration operation.

The instruction format also includes a source/destination specifier 554 and a source specifier 556. By way of example, each of these specifiers may include bits or one or more fields to specify an address of a register, memory location, or other storage location. The source/destination specifier 554 is to specify a storage location that is to have a source operand and the same specified storage location is also to be used as the destination where a result operand is to be stored. The source specifier 556 is to specify a storage location that is to have another source operand.

In some embodiments, the instruction also has an implicit RAX source 558. By implicit it is meant that the instruction format need not have bits or one or more fields to specify the RAX register but rather the RAX register may be implicit to the instruction (e.g., implicit to the opcode). In some embodiments, the instruction also has an implicit RDX source/destination 560. The RDX register may initially be used to store a source operand and subsequently to store a destination operand is to be stored.

It is to be appreciated that this is just one example embodiment of a suitable instruction format. This instruction format specifies or otherwise indicates only two operands/storage locations, whereas the others are implicit. In other embodiments fewer or more operands may be explicitly specified. In various embodiments, the instruction may have a format that explicitly specifies one, two, three, or more than three operands, with the others being implicit. Moreover, the illustrated order/arrangement of the fields and is not required, but rather the fields may be rearranged. Fields need not include contiguous sequences of bits but rather may be composed of non-contiguous or separated bits. Certain fields may possibly overlap. Alternate embodiments may also optionally add additional fields. For example, a field or one or more bits may be added to specify an operand size, qualify an operation as signed or unsigned, indicate whether or not saturation is to be used, etc.

FIG. 6 illustrates an example embodiment of a suitable 64-bit general-purpose register set 608. The 64-bit register set includes sixteen 64-bit or quadword general-purpose registers. These registers are referred to as RAX, RBX, RCX, RDX, RSI, RDI, RBP, RSP, R8, R9, R10, R11, R12, R13, R14, and R15. By way of example, quadword unsigned integers having 64-bits may be stored in the registers RAX, RBX, RCX, RDX, RSI, RDI, RBP, RSP, or R8-R15. These registers are also operable in 32-bit mode to store 32-bit operands. The lower 32-bits of the RAX, RBX, RCX, RDX, RSI, RDI, RBP, and RSP registers respectively correspond to registers EAX, EBX, ECX, EDX, ESI, EDI, EBP, and ESP registers. Doubleword unsigned integers having 32-bits may be stored in the registers EAX, EBX, ECX, EDX, ESI, EDI, EBP, ESP, R8D-R15D. The lower 32-bits of the registers R8-R15 are also addressable in 32-bit mode and are referred to by R8D-R15D. These 32-bit registers are also addressable in 16-bit and 8-bit modes. The lower 16 bits of the EAX, EBX, ECX, and EDX registers are referred to as AX, BX, CX, and DX, respectively (not shown). By way of example, word unsigned integers having 16-bits may be stored in the registers BX, CX, and DX, respectively. These general-purpose registers are available in various x86 architecture processors, and are suitable for implementing one or more embodiments, although these particular registers are not required. Other processors may have fewer or more registers, need not use such aliasing of larger registers on smaller registers, may have registers of different sizes, etc.

Components, features, and optional details described for any of FIGS. 3-6 may also optionally be used in any of FIGS. 1-2. Moreover, components, features, and optional details described herein for any of the apparatus described herein may optionally be used in and/or apply to any of the methods described herein, which in embodiments may be performed by and/or with such apparatus. Further, components, features, and optional details described herein for any of the processors described herein may optionally be used in and/or apply to any of the systems described herein, which in embodiments may include such processors.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-order and Out-of-order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
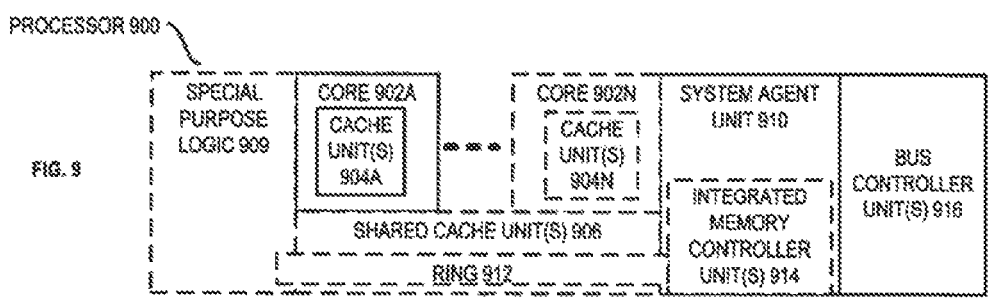
FIG. 9 is a block diagram of a processor that may have more than one core, may have an integrated memory controller, and may have integrated graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
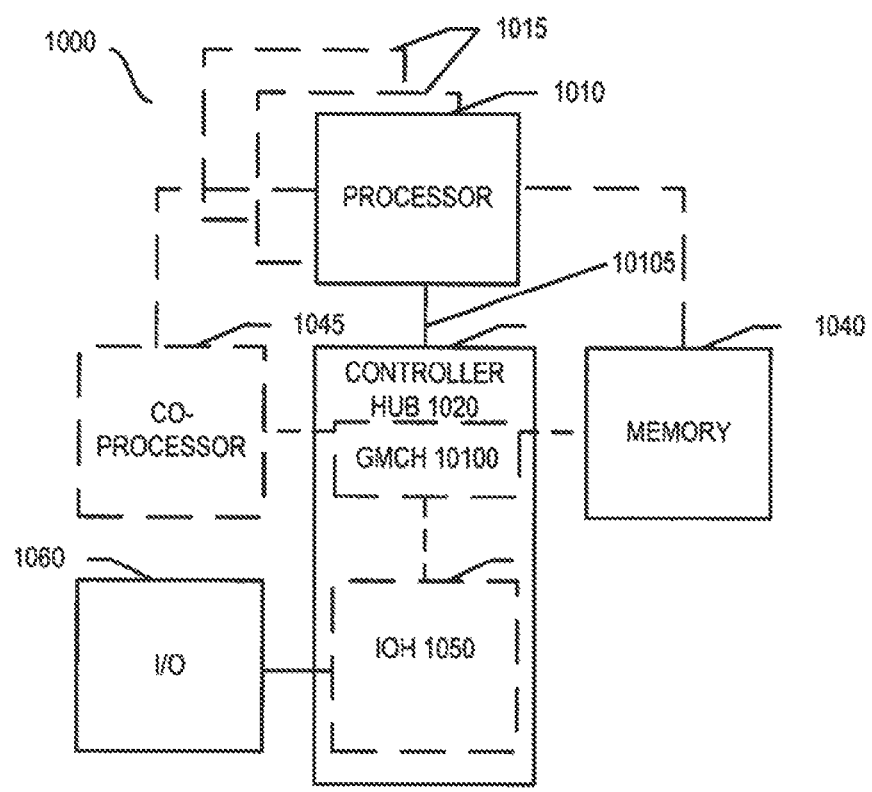
FIG. 10 shown is a block diagram of a system in accordance with one embodiment of the present invention.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
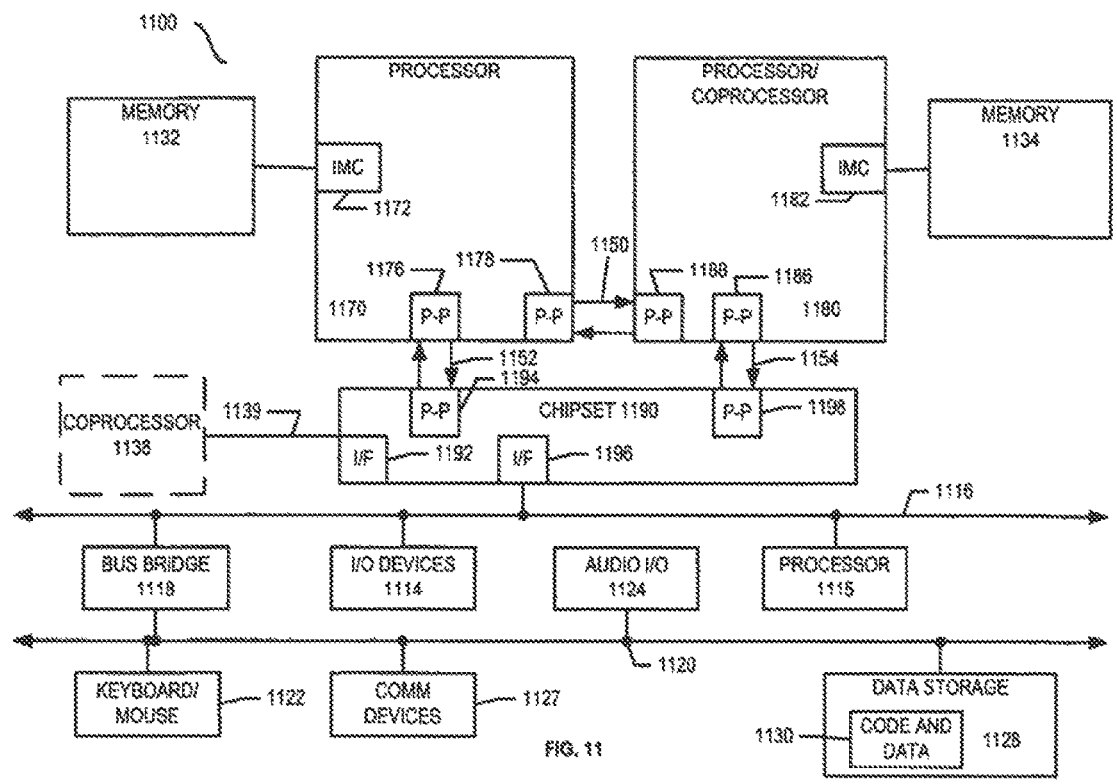
FIG. 11 shown is a block diagram of a first more specific exemplary system in accordance with an embodiment of the present invention.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
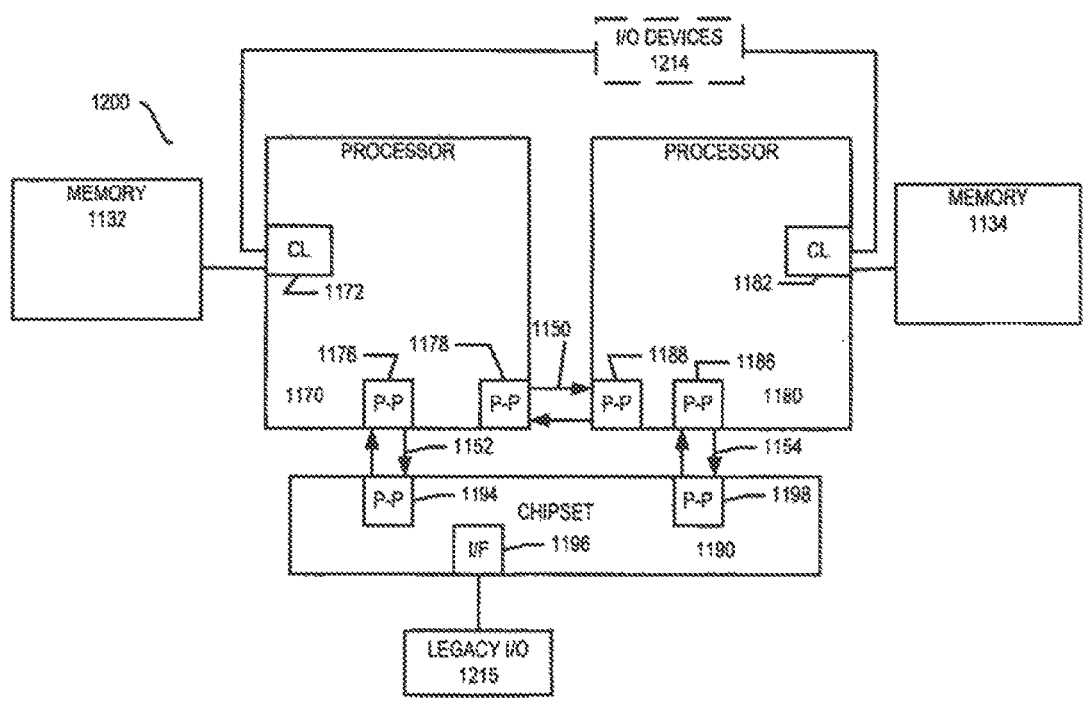
FIG. 12 shown is a block diagram of a second more specific exemplary system in accordance with an embodiment of the present invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
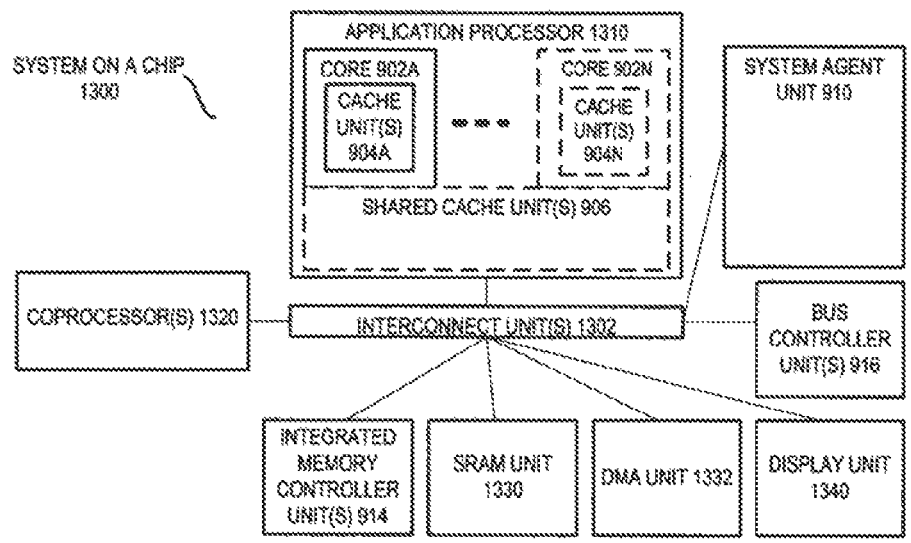
FIG. 13 shown is a block diagram of a SoC in accordance with an embodiment of the present invention.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with register(s) and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may store or otherwise provide one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, servers, network devices (e.g., routers and switches), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor or other apparatus that includes a decode unit to decode an instruction. The instruction is to indicate a first 64-bit source operand that is to have a first 64-bit value, to indicate a second 64-bit source operand that is to have a second 64-bit value, to indicate a third 64-bit source operand that is to have a third 64-bit value, and to indicate a fourth 64-bit source operand that is to have a fourth 64-bit value. An execution unit of the processor or apparatus is coupled with the decode unit. The execution unit is operable, in response to the instruction, to store a result. The result is to include the first 64-bit value multiplied by the second 64-bit value added to the third 64-bit value added to the fourth 64-bit value. The execution unit is to store a 64-bit least significant half of the result in a first 64-bit destination operand indicated by the instruction, and is to store a 64-bit most significant half of the result in a second 64-bit destination operand indicated by the instruction.

Example 2 includes the processor of Example 1 and optionally in which the decode unit is to decode the instruction which includes an RSA algorithm acceleration instruction.

Example 3 includes the processor of any preceding example and optionally in which the decode unit is to decode the instruction which is to implicitly indicate the second 64-bit source operand that is to have the second 64-bit value as a general-purpose register RAX.

Example 4 includes the processor of any preceding example and optionally in which the decode unit is to decode the instruction which is to implicitly indicate the second 64-bit destination operand that is to have the 64-bit most significant half of the result as a general-purpose register RDX.

Example 5 includes the processor of Example 1 and optionally in which the decode unit is to decode the instruction which is to implicitly indicate the second 64-bit source operand that is to have the second 64-bit value as a general-purpose register RAX, and is to implicitly indicate the second 64-bit destination operand that is to have the 64-bit most significant half of the result as a general-purpose register RDX.

Example 6 includes the processor of any preceding example and optionally in which the decode unit is to decode the instruction which is to explicitly specify the fourth 64-bit source operand that is to have the fourth 64-bit value, which is implicitly to be a same storage location as the first 64-bit destination operand that is to store the 64-bit least significant half of the result.

Example 7 includes the processor of any preceding example and optionally in which the decode unit is to decode the instruction which is to implicitly indicate the third 64-bit source operand that is to have the third 64-bit value, which is implicitly to be a same storage location as the second 64-bit destination operand that is to store the 64-bit most significant half of the result.

Example 8 includes the processor of Example 7 and optionally in which the storage location includes a general-purpose register.

Example 9 includes the processor of any preceding example and optionally in which the decode unit is to decode the instruction which is to have a format that is to explicitly specify only two operands.

Example 10 includes the processor of Example 9 and optionally in which the decode unit is to decode the instruction which is to: explicitly specify the first 64-bit source operand that is to have the first 64-bit value; implicitly indicate the second 64-bit source operand that is to have the second 64-bit value; implicitly indicate the third 64-bit source operand that is to have the third 64-bit value; explicitly specify the fourth 64-bit source operand that is to have the fourth 64-bit value; implicitly indicate the first 64-bit destination operand that is to store the 64-bit least significant half of the result to be a same storage location as to be used for the fourth 64-bit source operand that is to have the fourth 64-bit value; and implicitly indicate the second 64-bit destination operand that is to store the 64-bit most significant half of the result to be a same storage location as to be used for the third 64-bit source operand that is to have the third 64-bit value.

Example 11 includes the processor of any preceding example and optionally in which the execution unit includes a 128-bit storage location to store a sum of the third 64-bit value and a product of the first 64-bit value and the second 64-bit value.

Example 12 includes the processor of any preceding example and optionally in which the execution unit includes a 128-bit adder to add a value representing the third 64-bit value and a 128-bit product of multiplying the first 64-bit value and the second 64-bit value.

Example 13 is a method in a processor or other apparatus that includes receiving an instruction. The instruction indicates a first 64-bit source operand having a first 64-bit value, indicates a second 64-bit source operand having a second 64-bit value, indicates a third 64-bit source operand having a third 64-bit value, and indicates a fourth 64-bit source operand having a fourth 64-bit value. The method includes storing a result in response to the instruction. The result includes the first 64-bit value multiplied by the second 64-bit value added to the third 64-bit value added to the fourth 64-bit value. Storing the result includes storing a 64-bit least significant half of the result in a first 64-bit destination operand indicated by the instruction, and storing a 64-bit most significant half of the result in a second 64-bit destination operand indicated by the instruction.

Example 14 includes the method of Example 13 optionally performed during an OpenSSL library implementation of an RSA algorithm.

Example 15 includes the method of Example 14 optionally performed during a function bn_mul_mont of the OpenSSL library implementation of the RSA algorithm.

Example 16 includes the method of any preceding example and optionally in which receiving includes receiving the instruction implicitly indicating the second 64-bit source operand having the second 64-bit value as a general-purpose register RAX.

Example 17 includes the method of any preceding example and optionally in which receiving includes receiving the instruction implicitly indicating the second 64-bit destination operand having the 64-bit most significant half of the result as a general-purpose register RDX.

Example 18 includes the method of any preceding example and optionally in which receiving includes receiving the instruction implicitly indicating the second 64-bit source operand having the second 64-bit value as a general-purpose register RAX, and implicitly indicating the second 64-bit destination operand having the 64-bit most significant half of the result as a general-purpose register RDX.

Example 19 includes the method of any preceding example and optionally in which receiving includes receiving the instruction explicitly specifying the fourth 64-bit source operand having the fourth 64-bit value, which is also implicitly a same storage location as the first 64-bit destination operand that is used to store the 64-bit least significant half of the result.

Example 20 includes the method of any preceding example and optionally in which receiving includes receiving the instruction implicitly indicating the third 64-bit source operand having the third 64-bit value, which is also implicitly a same storage location as the second 64-bit destination operand that is used to store the 64-bit most significant half of the result.

Example 21 includes the method of any preceding example and optionally in which receiving includes receiving the instruction having a format explicitly specifying only two operands.

Example 22 is a processor or other apparatus that includes a plurality of general-purpose registers, and a decode unit to decode an RSA algorithm acceleration instruction. The RSA algorithm acceleration instruction to indicate a first 64-bit source operand that is to have a first 64-bit value, to implicitly indicate general-purpose register RAX as second 64-bit source operand that is to have a second 64-bit value, to indicate a third 64-bit source operand that is to have a third 64-bit value, and to indicate a fourth 64-bit source operand that is to have a fourth 64-bit value. The processor or other apparatus also includes an execution unit coupled with the decode unit and the plurality of general-purpose registers. The execution unit is operable, in response to the RSA algorithm acceleration instruction, to store a result. The result is to include the first 64-bit value multiplied by the second 64-bit value added to the third 64-bit value added to the fourth 64-bit value. The execution unit is to store a 64-bit least significant half of the result in a first 64-bit destination operand indicated by the instruction which is in a same storage location as a 64-bit source operand, and is to store a 64-bit most significant half of the result in implicitly indicated general-purpose register RDX as a second 64-bit destination operand indicated by the instruction.

Example 23 includes the processor of Example 22 and optionally in which the general-purpose register RDX is also to be used to store the third 64-bit value, in which the storage location used to store the 64-bit least significant half of the result is also to be used to store the fourth 64-bit value.

Example 24 is a system to process instructions that includes an interconnect and a processor coupled with the interconnect. The processor is to receive an instruction that is to indicate a first 64-bit source operand that is to have a first 64-bit value, to indicate a second 64-bit source operand that is to have a second 64-bit value, to indicate a third 64-bit source operand that is to have a third 64-bit value, and to indicate a fourth 64-bit source operand that is to have a fourth 64-bit value. The processor is operable, in response to the instruction to store a result that is to include the first 64-bit value multiplied by the second 64-bit value added to the third 64-bit value added to the fourth 64-bit value. The processor is to store a 64-bit least significant half of the result in a first 64-bit destination operand indicated by the instruction, and is to store a 64-bit most significant half of the result in a second 64-bit destination operand indicated by the instruction. The system also includes a dynamic random access memory (DRAM) coupled with the interconnect. The DRAM is to store an OpenSSL implementation of an RSA algorithm that is to use the instruction to update parameters of an array.

Example 25 includes the system of Example 24 and optionally in which the instruction is to implicitly indicate the second 64-bit source operand that is to have the second 64-bit value as a first general-purpose register, and is to implicitly indicate the second 64-bit destination operand that is to have the 64-bit most significant half of the result as a second different general-purpose register.

Example 26 is an article of manufacture that includes a non-transitory machine-readable storage medium. The non-transitory machine-readable storage medium stores an instruction that is to indicate a first 64-bit source operand that is to have a first 64-bit value, to indicate a second 64-bit source operand that is to have a second 64-bit value, to indicate a third 64-bit source operand that is to have a third 64-bit value, and to indicate a fourth 64-bit source operand that is to have a fourth 64-bit value. The instruction if executed by a machine operable to cause the machine to perform operations including storing a result. The result is to include the first 64-bit value multiplied by the second 64-bit value added to the third 64-bit value added to the fourth 64-bit value. A 64-bit least significant half of the result is to be stored in a first 64-bit destination operand indicated by the instruction, and a 64-bit most significant half of the result is to be stored in a second 64-bit destination operand indicated by the instruction.

Example 27 includes the article of Example 26 and optionally in which the instruction is to implicitly indicate the second 64-bit source operand that is to have the second 64-bit value as a first general-purpose register, and is to implicitly indicate the second 64-bit destination operand that is to have the 64-bit most significant half of the result as a second different general-purpose register.

Example 28 includes a processor or other apparatus that is operable to perform the method of any of Examples 13-21.

Example 29 includes a processor or other apparatus that includes means for performing the method of any of Examples 13-21.

Example 30 includes a processor that includes modules, units, logic, circuitry, means, or any combination thereof, to perform the method of any of Examples 13-21.

Example 31 includes a computer system or other electronic device including an interconnect, a processor coupled with the interconnect, and at least one component coupled with the interconnect that is selected from a DRAM, a graphics chip, a wireless communications chip, a phase change memory, and a video camera, the computer system or other electronic device to perform the method of any of Examples 13-21.

Example 32 includes an optionally non-transitory machine-readable medium that optionally stores or otherwise provides an instruction that if and/or when executed by a processor, computer system, or other machine is operable to cause the machine to perform the method of any of Examples 13-21.

Example 33 includes a processor or other apparatus that is operable to perform one or more operations or any method substantially as described herein.

Example 34 includes a processor or other apparatus including means for performing one or more operations or any method substantially as described herein.

Example 35 includes a processor or other apparatus that is operable to perform any of the instructions substantially as described herein.

Example 36 includes a processor or other apparatus including means for performing any of the instructions substantially as described herein.

What is claimed is:

1. A processor comprising:
   a decode unit to decode an instruction, the instruction to indicate a first 64-bit source operand that is to have a first 64-bit value, to indicate a second 64-bit source operand that is to have a second 64-bit value, to indicate a third 64-bit source operand that is to have a third 64-bit value, and to indicate a fourth 64-bit source operand that is to have a fourth 64-bit value; and
   an execution unit coupled with the decode unit, the execution unit operable, in response to the instruction, to store a result that is to include the first 64-bit value multiplied by the second 64-bit value added to the third 64-bit value added to the fourth 64-bit value, wherein the execution unit is to store a 64-bit least significant half of the result in a first 64-bit destination operand indicated by the instruction, and is to store a 64-bit most significant half of the result in a second 64-bit destination operand indicated by the instruction.

2. The processor of claim 1, wherein the decode unit is to decode the instruction which comprises an RSA algorithm acceleration instruction.

3. The processor of claim 1, wherein the decode unit is to decode the instruction which is to implicitly indicate the second 64-bit source operand that is to have the second 64-bit value as a general-purpose register RAX.

4. The processor of claim 1, wherein the decode unit is to decode the instruction which is to implicitly indicate the second 64-bit destination operand that is to have the 64-bit most significant half of the result as a general-purpose register RDX.

5. The processor of claim 1, wherein the decode unit is to decode the instruction which is to implicitly indicate the second 64-bit source operand that is to have the second 64-bit value as a general-purpose register RAX, and is to implicitly indicate the second 64-bit destination operand that is to have the 64-bit most significant half of the result as a general-purpose register RDX.

6. The processor of claim 1, wherein the decode unit is to decode the instruction which is to explicitly specify the fourth 64-bit source operand that is to have the fourth 64-bit value, which is implicitly to be a same storage location as the first 64-bit destination operand that is to store the 64-bit least significant half of the result.

7. The processor of claim 1, wherein the decode unit is to decode the instruction which is to implicitly indicate the third 64-bit source operand that is to have the third 64-bit value, which is implicitly to be a same storage location as the second 64-bit destination operand that is to store the 64-bit most significant half of the result.

8. The processor of claim 7, wherein the storage location comprises a general-purpose register.

9. The processor of claim 1, wherein the decode unit is to decode the instruction which is to have a format that is to explicitly specify only two operands.

10. The processor of claim 9, wherein the decode unit is to decode the instruction which is to:

explicitly specify the first 64-bit source operand that is to have the first 64-bit value;

implicitly indicate the second 64-bit source operand that is to have the second 64-bit value;

implicitly indicate the third 64-bit source operand that is to have the third 64-bit value;

explicitly specify the fourth 64-bit source operand that is to have the fourth 64-bit value;

implicitly indicate the first 64-bit destination operand that is to store the 64-bit least significant half of the result to be a same storage location as to be used for the fourth 64-bit source operand that is to have the fourth 64-bit value; and implicitly indicate the second 64-bit destination operand that is to store the 64-bit most significant half of the result to be a same storage location as to be used for the third 64-bit source operand that is to have the third 64-bit value.

11. The processor of claim 1, wherein the execution unit comprises a 128-bit storage location to store a sum of the third 64-bit value and a product of the first 64-bit value and the second 64-bit value.

12. The processor of claim 1, wherein the execution unit comprises a 128-bit adder to add a value representing the third 64-bit value and a 128-bit product of multiplying the first 64-bit value and the second 64-bit value.

13. A method in a processor, the method comprising:

receiving an instruction, the instruction indicating a first 64-bit source operand having a first 64-bit value, indicating a second 64-bit source operand having a second 64-bit value, indicating a third 64-bit source operand having a third 64-bit value, and indicating a fourth 64-bit source operand having a fourth 64-bit value; and storing a result in response to the instruction, the result including the first 64-bit value multiplied by the second 64-bit value added to the third 64-bit value added to the fourth 64-bit value, wherein storing the result includes storing a 64-bit least significant half of the result in a first 64-bit destination operand indicated by the instruction, and storing a 64-bit most significant half of the result in a second 64-bit destination operand indicated by the instruction.

14. The method of claim 13, performed during an OpenSSL library implementation of an RSA algorithm.

15. The method of claim 14, performed during a function $bn_{13}mul_{13}$ mont of the OpenSSL library implementation of the RSA algorithm.

16. The method of claim 13, wherein receiving comprises receiving the instruction implicitly indicating the second 64-bit source operand having the second 64-bit value as a general-purpose register RAX.

17. The method of claim 13, wherein receiving comprises receiving the instruction implicitly indicating the second 64-bit destination operand having the 64-bit most significant half of the result as a general-purpose register RDX.

18. The method of claim 13, wherein receiving comprises receiving the instruction implicitly indicating the second 64-bit source operand having the second 64-bit value as a general-purpose register RAX, and implicitly indicating the second 64-bit destination operand having the 64-bit most significant half of the result as a general-purpose register RDX.

19. The method of claim 13, wherein receiving comprises receiving the instruction explicitly specifying the fourth 64-bit source operand having the fourth 64-bit value, which is also implicitly a same storage location as the first 64-bit destination operand that is used to store the 64-bit least significant half of the result.

20. The method of claim 13, wherein receiving comprises receiving the instruction implicitly indicating the third 64-bit source operand having the third 64-bit value, which is also implicitly a same storage location as the second 64-bit destination operand that is used to store the 64-bit most significant half of the result.

21. The method of claim 13, wherein receiving comprises receiving the instruction having a format explicitly specifying only two operands.

22. A processor comprising:

a plurality of general-purpose registers;

a decode unit to decode an RSA algorithm acceleration instruction, the RSA algorithm acceleration instruction to indicate a first 64-bit source operand that is to have a first 64-bit value, to implicitly indicate general-purpose register RAX as second 64-bit source operand that is to have a second 64-bit value, to indicate a third 64-bit source operand that is to have a third 64-bit value, and to indicate a fourth 64-bit source operand that is to have a fourth 64-bit value; and an execution unit coupled with the decode unit and the plurality of general-purpose registers, the execution unit operable, in response to the RSA algorithm acceleration instruction, to store a result that is to include the first 64-bit value multiplied by the second 64-bit value added to the third 64-bit value added to the fourth 64-bit value, wherein the execution unit is to store a 64-bit least significant half of the result in a first 64-bit destination operand indicated by the instruction which is in a same storage location as a 64-bit source operand, and is to store a 64-bit most significant half of the result in implicitly indicated general-purpose register RDX as a second 64-bit destination operand indicated by the instruction.

23. The processor of claim 22, wherein the general-purpose register RDX is also to be used to store the third 64-bit value, wherein the storage location used to store the 64-bit least significant half of the result is also to be used to store the fourth 64-bit value.

24. A system to process instructions comprising:

an interconnect;

a processor coupled with the interconnect, the processor to receive an instruction that is to indicate a first 64-bit source operand that is to have a first 64-bit value, to indicate a second 64-bit source operand that is to have a second 64-bit value, to indicate a third 64-bit source operand that is to have a third 64-bit value, and to indicate a fourth 64-bit source operand that is to have a fourth 64-bit value, the processor operable, in response to the instruction to store a result that is to include the first 64-bit value multiplied by the second 64-bit value added to the third 64-bit value added to the fourth 64-bit value, wherein the processor is to store a 64-bit least significant half of the result in a first 64-bit destination operand indicated by the instruction, and is to store a 64-bit most significant half of the result in a second 64-bit destination operand indicated by the instruction; and a dynamic random access memory (DRAM) coupled with the interconnect, the DRAM to store an OpenSSL implementation of an RSA algorithm that is to use the instruction to update parameters of an array.

25. The system of claim 24, wherein the instruction is to implicitly indicate the second 64-bit source operand that is to have the second 64-bit value as a first general-purpose register, and is to implicitly indicate the second 64-bit destination operand that is to have the 64-bit most significant half of the result as a second different general-purpose register.

* * * * *